United States Patent

Lin

[11] Patent Number: 5,862,739
[45] Date of Patent: Jan. 26, 1999

[54] INFUSION MAKER

[76] Inventor: Yu-Mei Tien Lin, P.O. Box 82-144, Taipei, Taiwan

[21] Appl. No.: 980,437

[22] Filed: Nov. 28, 1997

[51] Int. Cl.$^6$ .............................. A47J 31/00; A47J 31/02; A47J 31/10; A47J 31/24
[52] U.S. Cl. ............................... 99/285; 99/295; 99/299; 99/305; 99/306
[58] Field of Search .................................. 99/323, 323.3, 99/279–305, 510–513, 306–322; 141/87; 210/453–455, 464, 474, 482, 496, 238, 419, 430; 426/77–82, 241, 433, 435

[56] References Cited

U.S. PATENT DOCUMENTS

| | | | |
|---|---|---|---|
| 933,917 | 9/1909 | Norwood | 99/323 |
| 1,665,143 | 4/1928 | McMillan | 99/299 |
| 2,187,029 | 1/1940 | Hevers | 99/279 |
| 3,566,770 | 3/1971 | Crossley | 99/289 R |
| 4,266,471 | 5/1981 | Rosengren | 99/305 |
| 4,354,427 | 10/1982 | Fillipowicz et al. | 99/307 X |
| 4,426,920 | 1/1984 | Phillips et al. | 99/307 |
| 4,527,467 | 7/1985 | Siemensma | 99/279 |
| 4,653,390 | 3/1987 | Hayes | 99/281 X |
| 4,771,680 | 9/1988 | Snowball et al. | 99/295 |
| 5,632,193 | 5/1997 | Shen | 99/285 |
| 5,632,194 | 5/1997 | Lin | 99/285 |
| 5,725,765 | 3/1998 | Shen | 210/238 |

Primary Examiner—Timothy F. Simone
Attorney, Agent, or Firm—A & J

[57] ABSTRACT

An infusion maker includes a lid, a filter, a stopper, a basket, a retaining frame, and a jug. The basket has a through hole at the center of its bottom side, and a bottom extended wall with spaced slots. The retaining frame includes an annular ring at the top, an outer annular frame, supports erected between the annular ring and the outer annular frame, and an inner annular frame disposed inside the outer annular frame and connected thereto by reinforcing ribs. The inner annular frame is provided with a bearing seat for receiving the stopper. The outer annular frame is externally provided with bulges for engaging the slots of the basket. The retaining frame is fitted over the basket from below and they are placed into the jug with the annular ring suspended on the rim of the jug. The basket slips downwardly of its own weight so that the stopper blocks the through hole of the basket to allow immersion of substances like coffee in the basket. The lid can be lifted by holding the lugs so that the stopper disengages from the through hole and the coffee inside the basket flows quickly through the through hole into the jug below.

3 Claims, 10 Drawing Sheets under the invention relates generally to an infusion maker, and more particularly to an infusion maker which is convenient to use.

INFUSION MAKER

BACKGROUND OF THE INVENTION

1. Field of the Invention

The present invention relates generally to an infusion maker, and more particularly to an infusion maker which is convenient to use.

2. Description of the Prior Art

One way of making coffee is to put a filter paper at the bottom of a container with bottom through holes for filtering the coffee. The coffee thus made is not very good since the coffee cannot be immersed to allow it to yield its good flavor. An infusion maker that can be conveniently used to make coffee quickly is desirable for busy people.

SUMMARY OF THE INVENTION

The present invention relates generally to an infusion maker, and more particularly to an infusion maker which is convenient to use.

Accordingly, a primary object of the present invention is to provide an infusion maker that can allow the user to make a certain amount of drinks such as coffee in a convenient and fast way.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
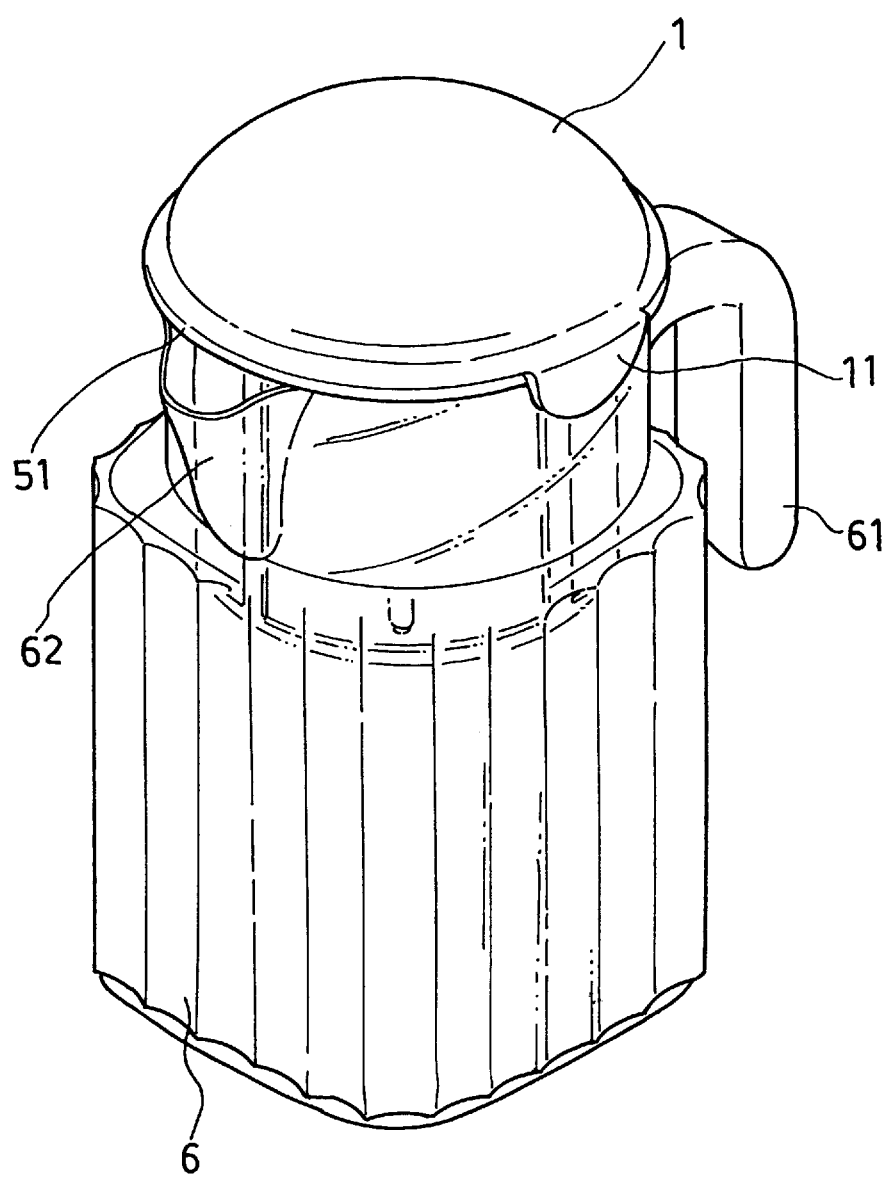
FIG. 1 is a schematic perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
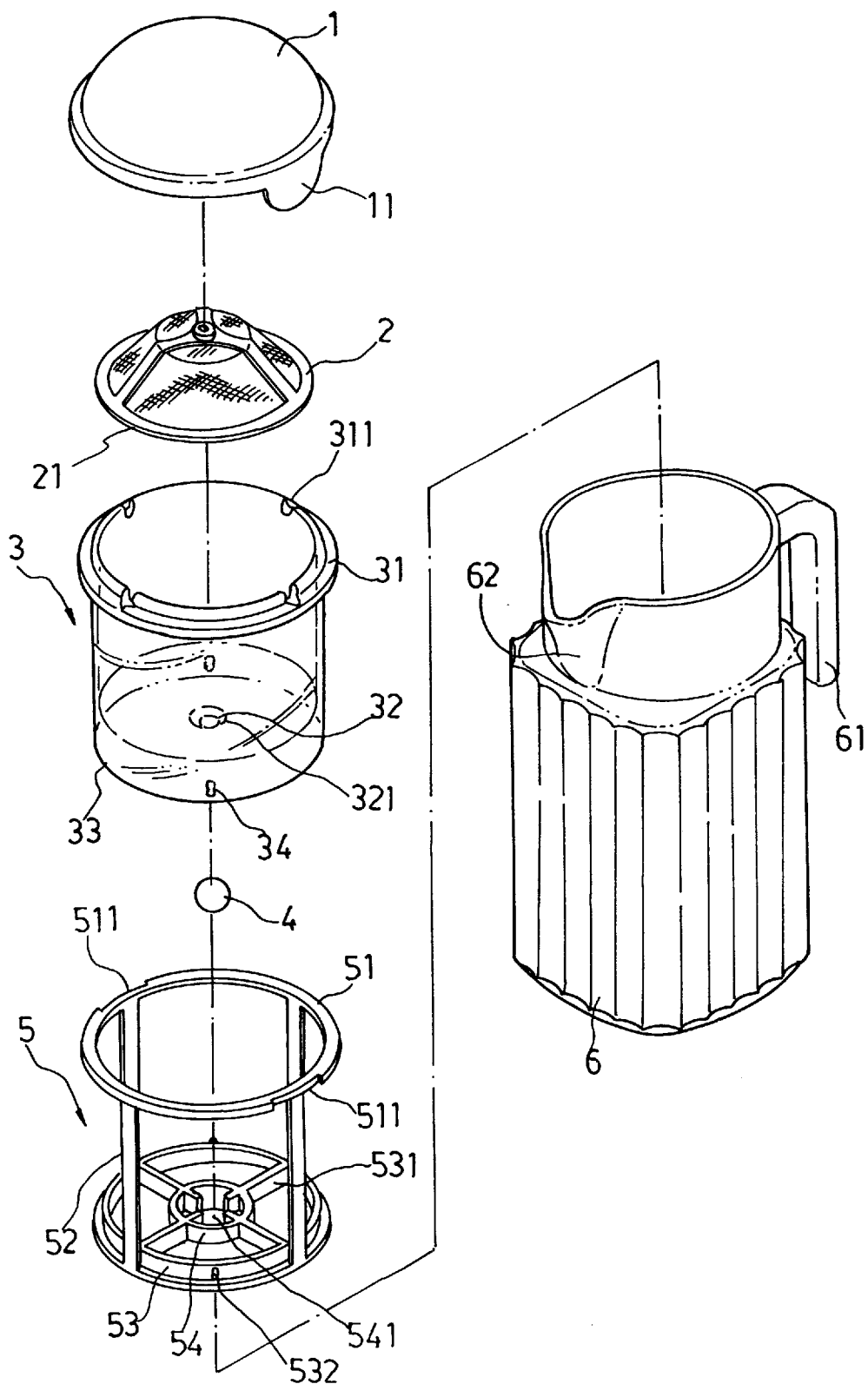
FIG. 2 is a schematic exploded view of the present invention.

With reference to FIGS. 1 and 2, the present invention comprises a lid 1, a filter 2, a basket 3, a stopper 4, a retaining frame 5, and a jug 6.

The lid 1 has symmetrical downwardly orienting lugs 11 at both sides respectively. The basket 3 is provided with a horizontally projecting flange 31 at an upper end for engaging the lugs 11 of the lid 1. The flange 31 is provided with a plurality of spaced notches 311 to allow air circulation when the lid 1 is put in place on top of the basket 3 so that smooth discharge of substances being infused in the basket 3, such as coffee, into the jug 6 below. The filter 2 has a circular rim which is provided with spaced ribs 21 for directly engaging the inner wall of the basket 3. The basket 3 has a through hole 32 formed in the center of its bottom side. The bottom side of the basket 3 is a conical surface tapering towards the bottom end. Around the through hole 32 is a conical portion 321 of an inclination different from that of the conical surface of the basket 3. Such a configuration allows substances like coffee inside the basket 3 to flow past two surfaces with different inclination so as to achieve fast discharge. A bottom wall 33 of a suitable height projects downwardly from the bottom end of the basket 3. The bottom wall 33 is provided with a plurality of spaced vertical elongated slots 34. In the embodiments shown in the drawings, there are four slots 34.

The retaining frame 5 includes an annular ring 51 at an upper end, a plurality of supports 52, an outer annular frame 53, and an inner annular frame connected to the outer annular frame 53. The annular ring 51 has an internal diameter which is slightly larger than the external diameter of the basket 3. Two symmetrical notches 511 are formed at both sides of the annular ring 51 for matching the lugs 11 of the lid 1. The supports 52 are erected between the annular ring 51 and the outer annular frame 53. The external periphery of the outer annular frame 53 is provided with spaced bulges 532 for engaging the slots 34 of the basket 3. The reinforcing ribs 531 are in the form of a cross and connect the outer annular frame 53 to the inner annular frame 54. Those portions of the reinforcing ribs 531 side the inner annular frame 54 are stepped and connected to a bearing seat 541 for supporting the stopper 4. The annular ring 51 as a whole is fitted around the basket 3. When the basket 3 is inserted into the retaining frame 5, the bulges 532 of the outer annular frame 53 can be squeezed into the slots 34 of the bottom wall 33 of the basket 3 since both the basket 3 and the retaining frame 5 are made of plastics material such as heat-resistant non-toxic PC that allows elastic deformation. Hence, the retaining frame 5 can be properly engaged without moving sideways.

The jug 6 includes a handle 61 at one side and a spout 62 at the other side.

Figure 3:
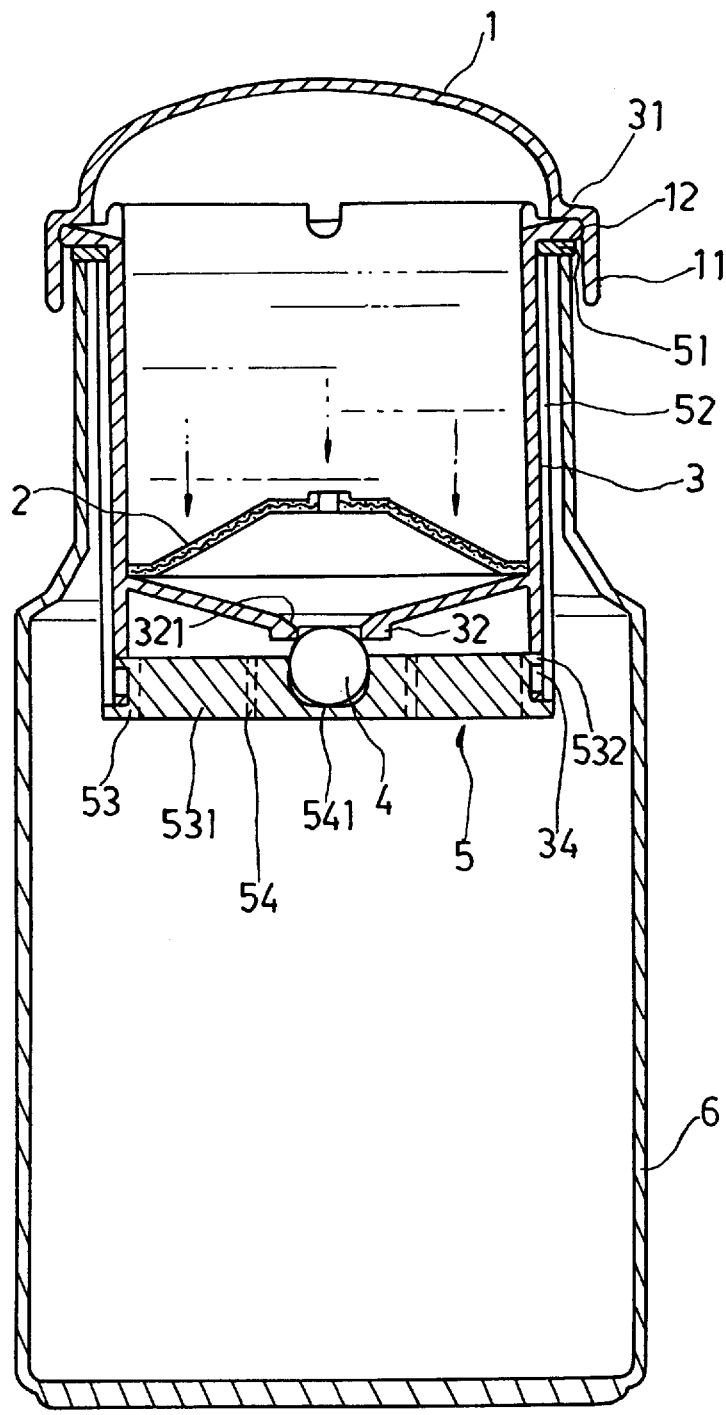
FIG. 3 is a sectional assembled view of the present invention.

With reference to FIG. 3, the inner side of the lid 1 is circumferentially provided with a retaining groove 12 for engaging the flange 31 of the basket 3. Hence, the basket 3 can be lifted from the retaining frame 5 or fitted thereinto by holding the lugs 11 of the lid 1, without the hands directly touching the walls of the basket 3 which may be very hot. When the basket 3 and the retaining frame 5 are both placed inside the jug 6, the annular ring 51 will be suspended on the opening of the jug 6 while the basket 3 slips downwardly of its own weight, with the stopper 4 blocking the through hole 32 so that the substances like coffee can be put into the basket for immersion. With the pressure of the coffee acting downwardly on the stopper 4, the stopper 4 will remain tight and prevents any coffee leakage. Thus, the coffee will have a better flavor after being immersed for a suitable period of time.

Figure 4:
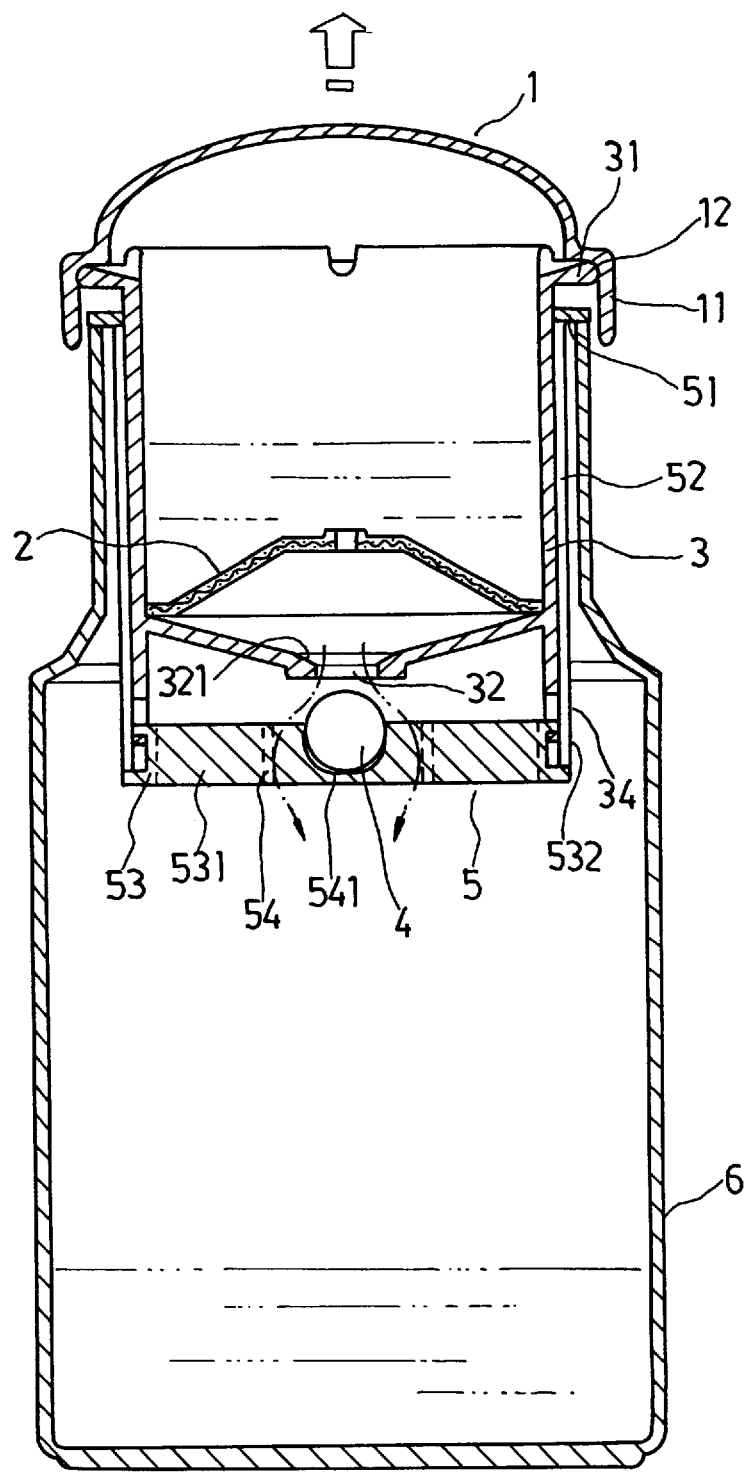
FIGS. 4 and 5 are schematic views illustrating operation of the present invention.

Referring to FIG. 4, when the basket 3 is lifted by holding the lugs 11 of the lid 1 after the coffee has been infused for a sufficient period of time, the retaining frame 5 will slip downwardly of its own weight so that the stopper 4 disengages from the through hole 32. The coffee therefore flows quickly downwardly through the through hole and the spaces among the reinforcing ribs 531 into the jug 6 below.

Figure 5:
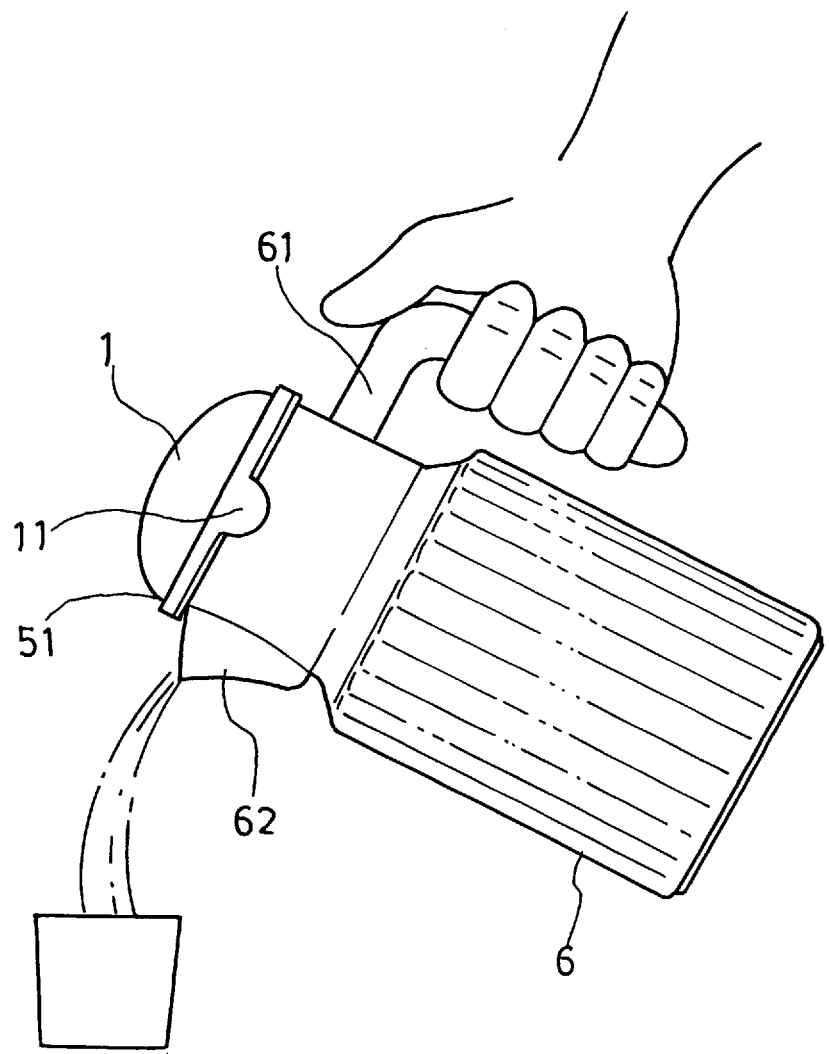

Referring to FIG. 5, the handle 61 can be held to pour out the coffee in the jug 6 via the spout 62. In addition, the annular ring 51 of the retaining frame 5 is cut level with the lid 1. Therefore, the user may hold the annular ring 51 to lift up the retaining frame 5 together with the basket 3 therein and place them on the table to facilitate serving from the jug 6.

Figure 6:
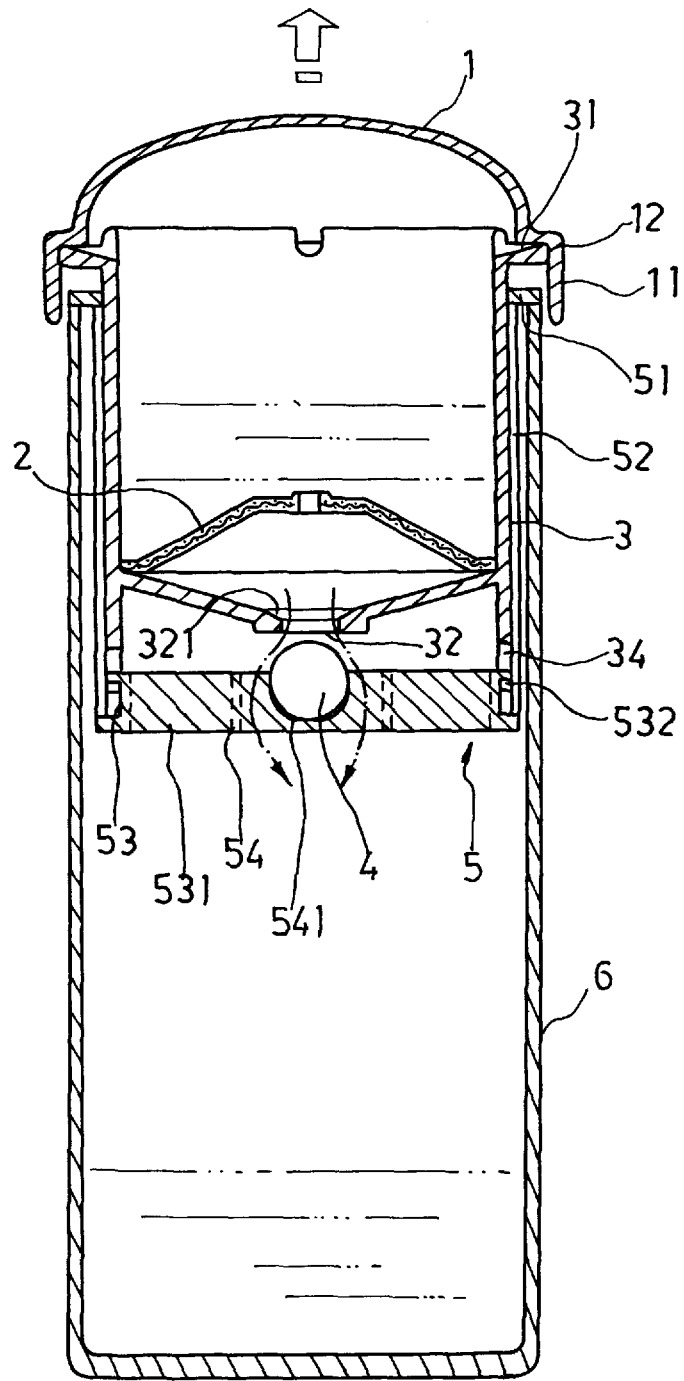
FIG. 6 is a schematic view of another embodiment of the present invention.
Figure 7:
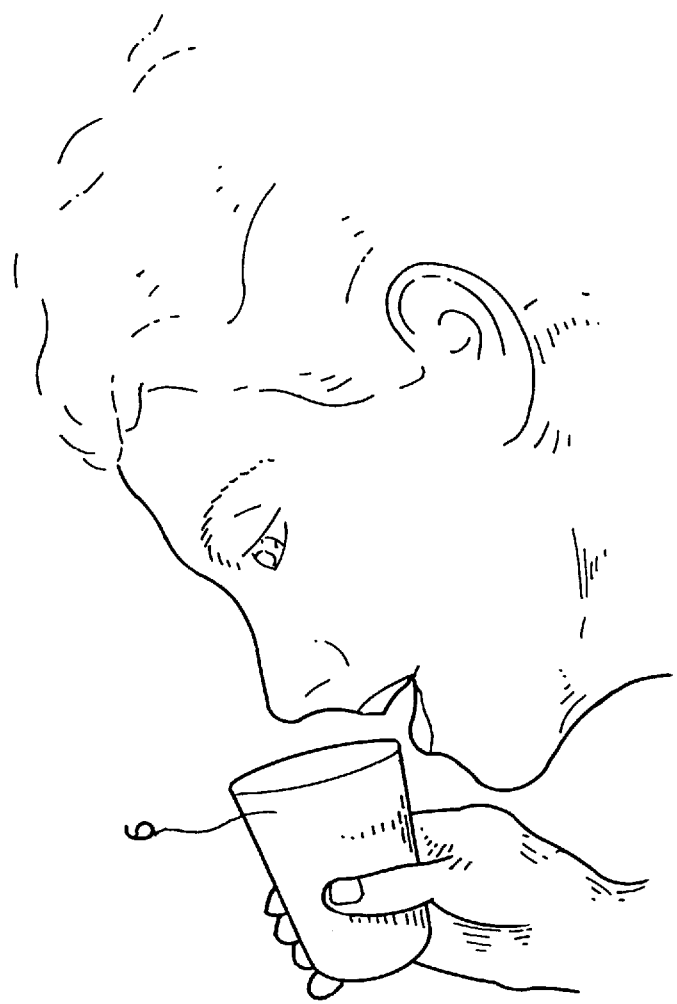
FIG. 7 is a schematic view illustration operation of the embodiment shown in FIG. 6.
Figure 7A:
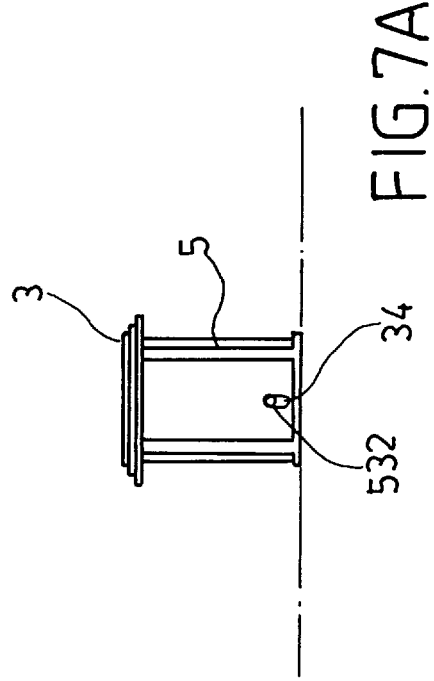
FIG. 7A illustrates a side elevational view of the basket.

Referring to FIGS. 6, 7 and 7A, the jug 6 may be configured to resemble a drinking glass that the user may directly hold and drink from the glass. Besides, the basket 3 may also be sized to match an ordinary teacup so that it may be suspended on the rim of the teacup. It can therefore be appreciated that the present invention has wide applications.

Figure 8:
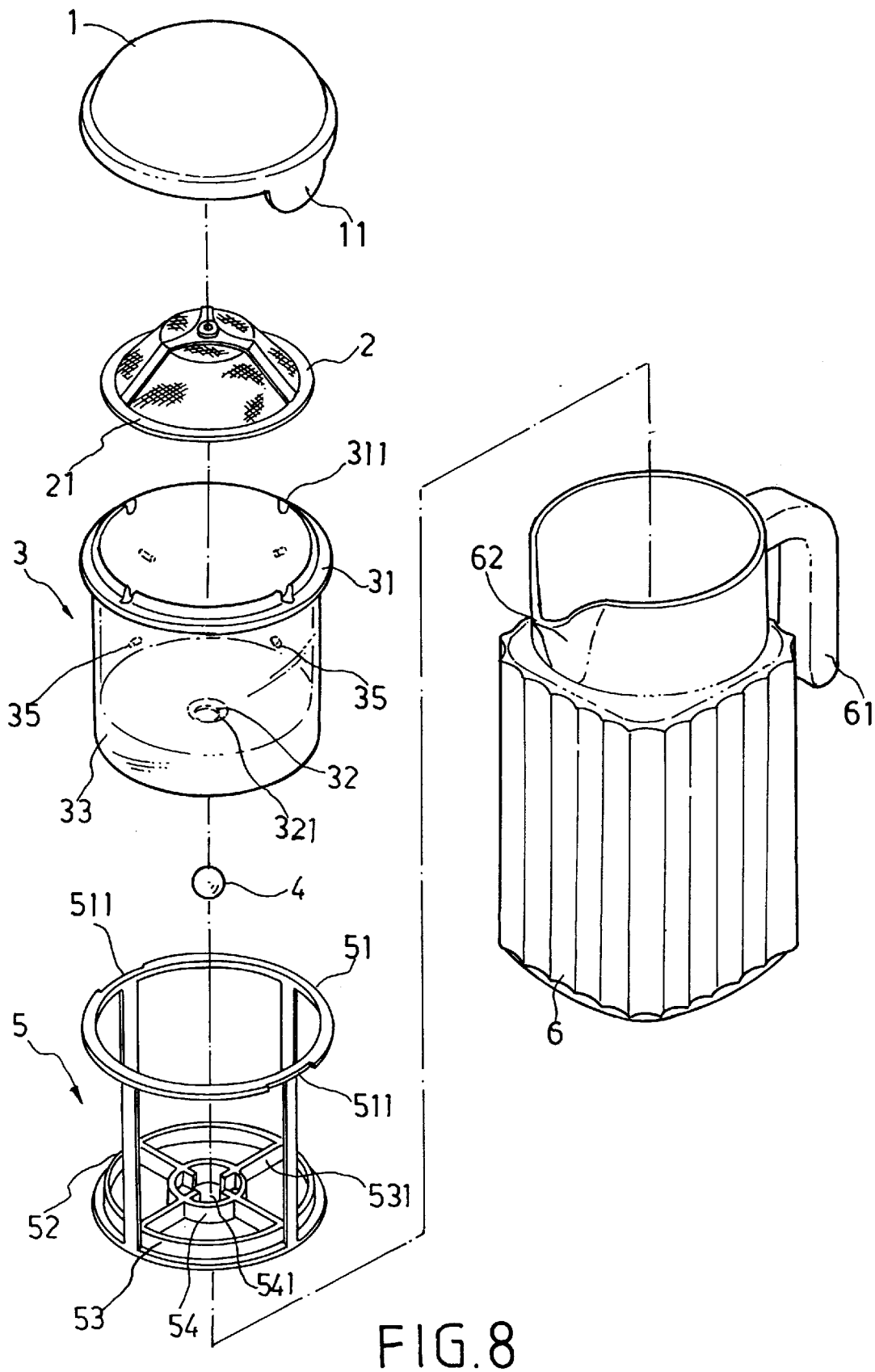
FIG. 8 is a schematic view of another embodiment of the retaining frame of the present invention.

With reference to FIG. 8, showing yet another embodiment of the present invention, the bottom wall 33 of the basket 3 is not provided with any elongated slot. Instead, a plurality of spaced bosses 35 are formed on the outer wall of the body of the basket 3. In the drawings, there are four equally spaced bosses 35. Besides, the outer annular frame 53 is not provided with any bulges. When the basket 3 is inserted into the retaining frame 5, the annular ring 51 may be squeezed past over the bosses 35 to fit on the basket 3, with the bosses 35 located below the annular ring 51 and sideways of the supports 52 so that the retaining frame 5 may displace along the outer wall of the basket 3 to a certain extent and be stopped by the bosses 35. At the same time, the retaining frame 5 is prevented from moving sideways by the bosses 35.

Figure 9:
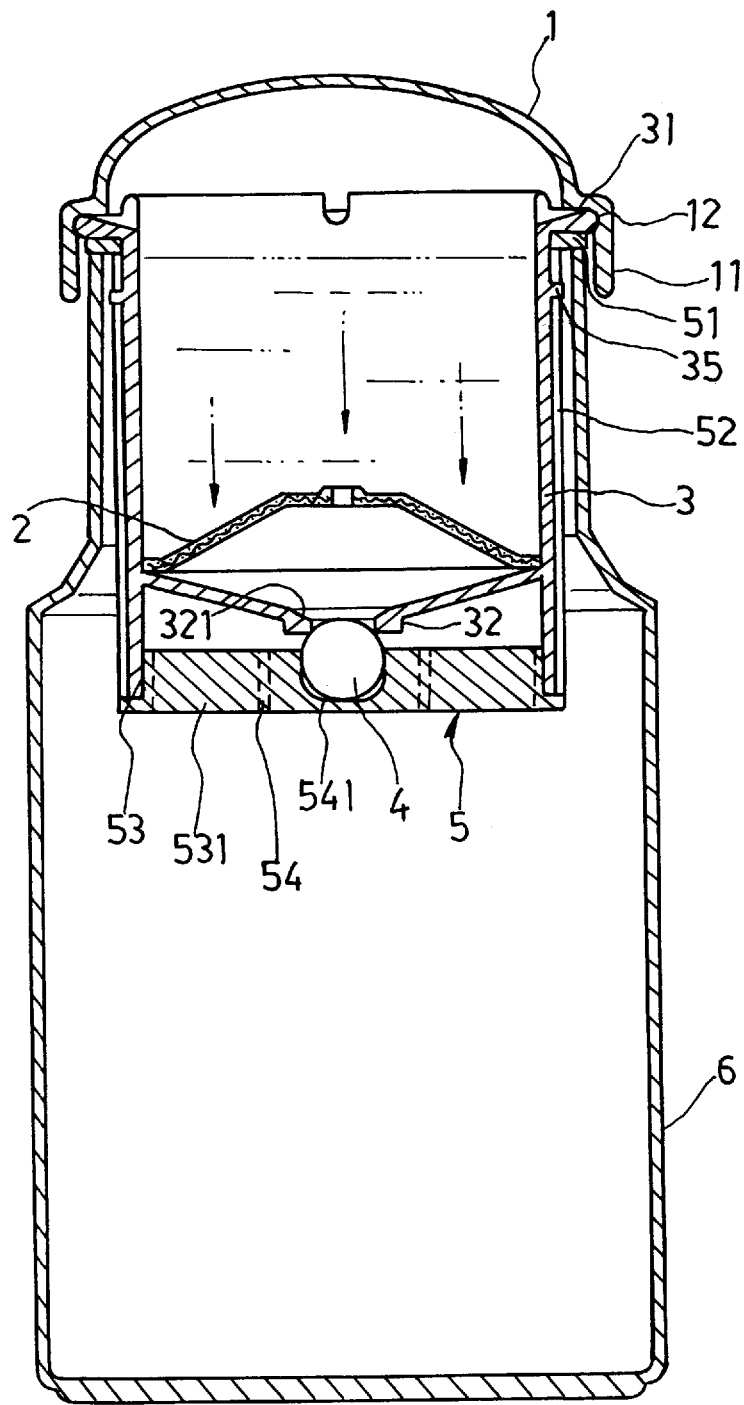
FIGS. 9 and 10 are schematic views illustrating operation of the embodiment shown in FIG. 8.

Referring to FIG. 9, the basket 3 together with the retaining frame 5 is placed inside the jug 6, with the annular ring 51 suspended on the opening of the jug. The basket 3 slips downwardly of its own weight so that the stopper 4 blocks the through hole 32 and substances like coffee may be put into the basket 3 for immersion.

Figure 10:
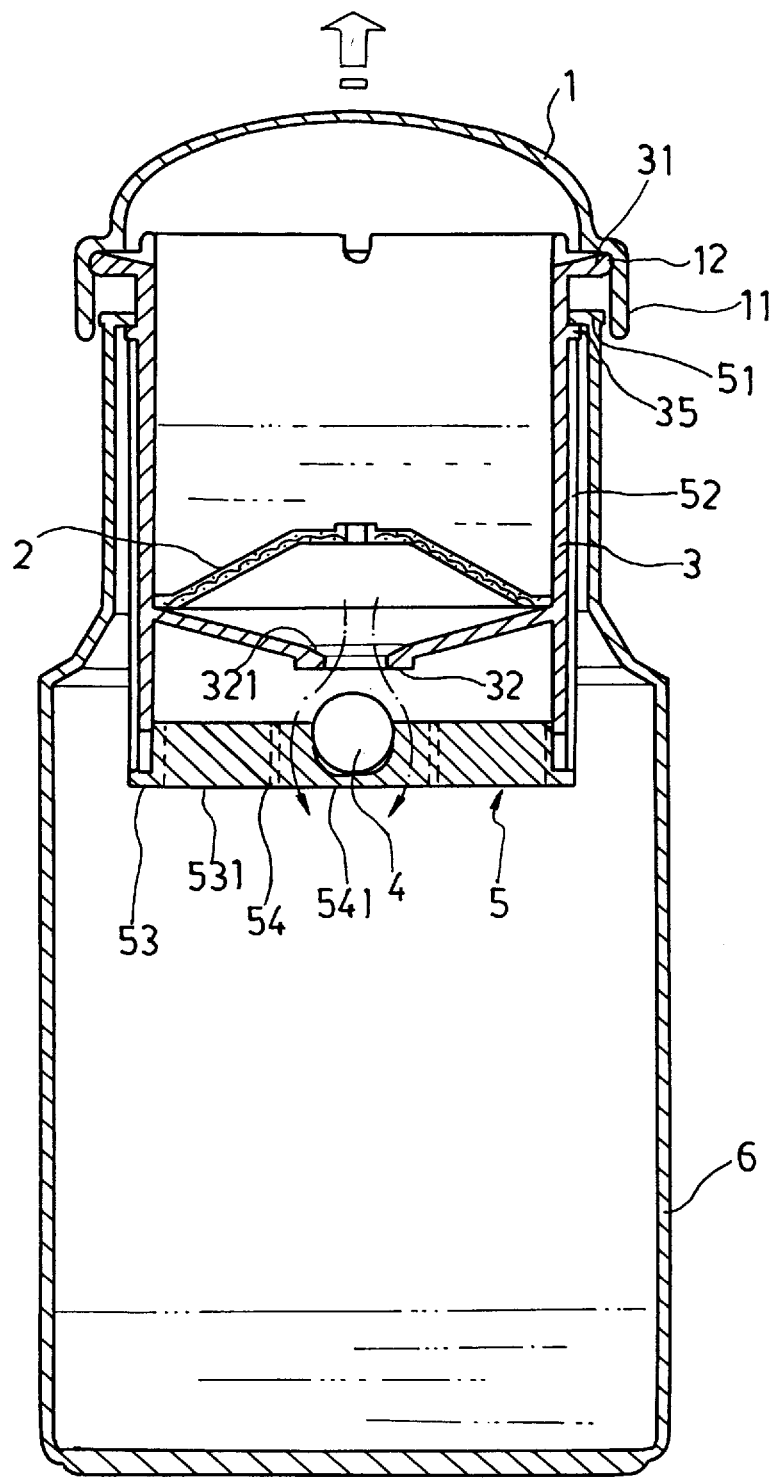

Referring to FIG. 10, after the coffee has been immersed for a desirable period of time, the user may hold the lugs 11 of the lid to lift up the basket 3 while the retaining frame 5 slips downwardly of its own weight but is checked by the bosses 35, thereby causing the stopper 4 to disengage from the through hole 32 to allow quick discharge of coffee into the jug 6 via the through hole 32 and the spaces among the reinforcing ribs 531.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An infusion maker, comprising:

a lid, having two downwardly extending lugs respectively at both sides, and a retaining groove circumferentially formed at an inner rim thereof;

a basket, having a body, an opening, a horizontally extending flange at said opening, a filter disposed inside said body, a bottom side having an conical surface, said bottom side having a through hole at its center, said through hole being surrounded by a conical portion of a inclination different from that of said conical surface of said bottom side, said body of said basket extending downwardly to form a bottom extended wall of a suitable height, said extended wall being provided with a plurality of spaced elongated slots; a stopper;

a retaining frame, including an annular ring having an internal diameter slightly larger than the external diameter of said basket, an outer annular frame, a plurality of supports erected between said annular ring and said outer annular frame, and an inner annular ring disposed within said outer annular frame and connected to said outer annular frame by reinforcing ribs, said outer annular frame being externally provided with spaced bulges for matching said slots of said extended wall of said basket, said reinforcing ribs inside said inner annular frame being stepped and connected to a bearing seat for receiving said stopper so that said retaining frame can be fitted on said basket as a whole; and a jug, having a handle on one side, and a spout on the other side, whereby said said lid may be directly fitted on said opening of said basket, and said basket and said retaining frame are both fitted into said jug with said annular ring of said retaining frame suspended on the opening of said jug, said basket slipping downwardly of its own weight so that said stopper blocks and tightly seals said through hole of said basket to allow immersion of substances like coffee in said basket, said basket can be lifted up by holding said lugs of said lid so that said stopper disengages from said through hole to allow quick discharge of coffee into said jug below, ready for serving from said jug.

2. The infusion maker as claimed in claim 1, wherein said annular ring of said retaining frame is provided with notches for matching said lugs of said lid, said annular ring having an external diameter equivalent to that of said lid.

3. The infusion maker as claimed in claim 1, wherein said extended wall of said basket is not provided with any elongated slots whereas said body of said basket is externally provided with spaced bosses, and said outer annular frame of said retaining frame is not provided with any bulges, whereby said retaining frame can be fitted over said basket as a whole with said bosses of said basket located below said annular ring and sideways of said supports.

* * * * *